July 1, 1947. S. R. THORNTON 2,423,272
COMBINED SPECTACLES AND FILTERS THEREFOR
Filed June 14, 1944
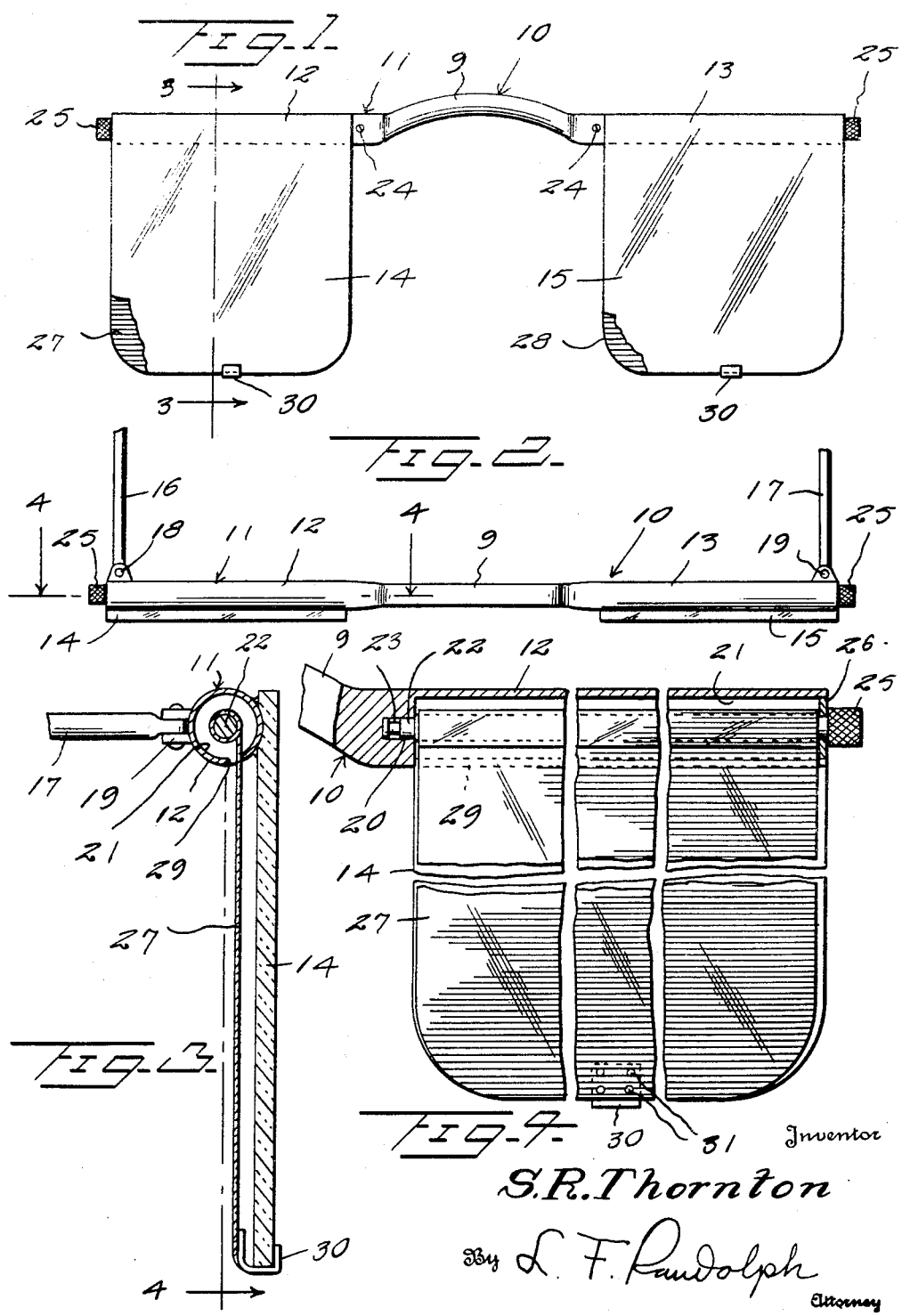
Inventor
S. R. Thornton
By L. F. Randolph
Attorney Patented July 1, 1947

2,423,272

UNITED STATES PATENT OFFICE 2,423,272

COMBINED SPECTACLES AND FILTERS THEREFOR

Stuart R. Thornton, San Francisco, Calif.

Application June 14, 1944, Serial No. 540,235

1 Claim. (Cl. 88—41)

This invention relates to combined spectacles and filters for the eye glass lenses thereof whereby the light which passes through the lenses is softened and shaded. More specifically, the present invention contemplates the provision of spectacles of the aforedescribed type in which the filters are formed of flexible, transparent material and are adapted, when not in use, to be wound up inside tubes respectively corresponding thereto and comprising the structural supports for the eye glass lenses of the spectacles.

The foregoing and other objects and advantages of the invention will become more clearly apparent from the following description of a preferred structural embodiment thereof, reference being had to the accompanying drawings wherein:

Figure 1 is a front elevational view of the combined spectacles and filters therefor according to the preferred embodiment of the invention, Figure 2 is a top view of the spectacles shown in Figure 1, portions of the ear supports therefor being broken away for the sake of simplicity, Figure 3 is an enlarged view taken along the line 3—3 of Figure 1, and Figure 4 is an enlarged sectional view taken along the line 4—4 of Figure 2.

Referring now to the drawings, the numeral 10 generally designates a pair of spectacles which is constructed according to the best mode so far devised for the practical application of the principles of the invention.

Spectacles 10 comprises a unitary structural member generally designated 11 and having generally tubular shaped end portions or arms 12, 13 to which the eye glass lenses 14, 15 respectively are secured in any conventional manner and a somewhat reduced and arcuate central portion or bridge 9 which serves as the nose support for the spectacles, ear supports or temples 16, 17 therefor being pivotally secured in the usual manner to member 11 adjacent the ends thereof as at 18, 19 respectively.

Each of the end portions 12, 13 of member 11 is provided with a bore or socket 20 which is centrally disposed with respect to the cylindrical chamber 21 therein. One end of a spool or reel 22 is received into the bore 20 and is provided with an annular groove 23 into which a screw 24 carried by the member 11 may be inserted, thereby to retain the spool in position in the chamber 21, substantially as shown. The other end of spool 22 carries a knurled knob 25 which may be formed integrally therewith if desired, and adjacent knob 25 is a washer 26 which serves to maintain this end of the spool in a central position with respect to chamber 21.

Flexible filters or shades 27, 28 are carried by the spools in end portions 12, 13 respectively, and may be secured to their respective spools in any convenient manner as by cementing the parts together, for example. Slotted openings 29 are provided in the end portions 12, 13 for permitting the filters therein to be withdrawn and extended into the position as best appears in Figures 3 and 4, the filters being substantially of the same shape as the lenses respectively associated therewith. Each filter is maintained in the extended position thereof by means of a clip 30 secured thereto as by screws 31, which clip is formed U-shaped so as to be adapted to engage the bottom of the lens as best appears in Figure 3.

The filters may be formed of any flexible, transparent and non-inflammable material suitable for the purpose such as is commonly used in light filters.

In the use of the spectacles, with the filters wound upon the spools, the eye glass lenses 14, 15 are used in the usual manner. When it is desired to shade or soften the light passing through the lenses, it merely is necessary to turn the knobs 25 until the filters are unwound to their fully extended positions and to secure the clips 30 to the lenses. When the filters are no longer needed, they may be withdrawn within the tubular end portions of member 11 merely by releasing the clips 30 and winding the knobs 25.

From the foregoing it should now be apparent that combined spectacles and filters therefor have been provided which are simple in construction and use and embodies all of the desired qualities of ruggedness, compactness, and economy of manufacture.

While the invention has been described in particularity with respect to an example thereof which gives satisfactory results, it will be apparent to those skilled in the art to which the invention appertains that the same is susceptible of additional embodiments, variations, and additions without departing from the spirit and scope of the invention as defined by the appended claim.

I claim as my invention:

Spectacles comprising a bridge member, arms projecting outwardly from the ends of the bridge member and each being grooved at its underside, each end of the bridge member being formed with a socket, eyeglass lenses depending from the arms, rolls disposed longitudinally in the grooved arms and having pintles at their inner and outer ends, the inner pintles projecting into the sockets and being grooved, removable elements projecting into the sockets and into the grooves of the inner pintles, the outer pintles projecting through the outer ends of the arms and provided with finger engageable knobs, flexible shades windable on the rolls and provided at their outer ends with detent means for engaging the lower edges of the eyeglass lenses when said shades are fully extended to prevent retraction and hold shades in proper extended position with respect to the corresponding lenses.

STUART R. THORNTON.

REFERENCES CITED

The following references are of record in the file of this patent:

UNITED STATES PATENTS

| Number | Name | Date |
| --- | --- | --- |
| 1,571,019 | Lucas | Jan. 26, 1926 |
| 1,596,810 | Cooney | Aug. 17, 1926 |
| 1,969,710 | Jones | Aug. 7, 1934 |
| 1,441,487 | Doner | Jan. 9, 1923 |
| 1,476,336 | Hitchings | Dec. 4, 1923 |

FOREIGN PATENTS

| Number | Country | Date |
| --- | --- | --- |
| 67,614 | Austria | Jan. 25, 1915 |